US009519670B2

(12) United States Patent
Stanek et al.

(10) Patent No.: US 9,519,670 B2
(45) Date of Patent: Dec. 13, 2016

(54) METHOD AND APPARATUS FOR ROAD RISK INDICES GENERATION

(71) Applicant: Ford Global Technologies, LLC, Dearborn, MI (US)

(72) Inventors: Joseph F. Stanek, Northville, MI (US); John Ottavio Michelini, Sterling Heights, MI (US); Timothy Mark Feldkamp, Ann Arbor, MI (US); Jianbo Lu, Northville, MI (US); Fling Tseng, Ann Arbor, MI (US); Anthony Mario D'Amato, Canton, MI (US); Pankaj Kumar, Dearborn, MI (US); Ryan Lee Baker, Dearborn Heights, MI (US); Medville J. Throop, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 14/473,272

(22) Filed: Aug. 29, 2014

(65) Prior Publication Data

US 2016/0063045 A1  Mar. 3, 2016

(51) Int. Cl.
*G06F 17/10* (2006.01)
*G06F 17/30* (2006.01)
(52) U.S. Cl.
CPC ... *G06F 17/30336* (2013.01); *G06F 17/30616* (2013.01)
(58) Field of Classification Search
USPC ....................................................... 701/301
See application file for complete search history.

(56) References Cited

U.S. PATENT DOCUMENTS

| 6,175,803 | B1* | 1/2001 | Chowanic | G01C 21/34 340/988 |
| 6,542,812 | B1* | 4/2003 | Obradovich | G01C 21/3461 340/990 |
| 6,807,481 | B1* | 10/2004 | Gastelum | G01C 21/3697 340/438 |
| 8,160,811 | B2* | 4/2012 | Prokhorov | G08G 1/161 701/300 |
| 8,606,512 | B1* | 12/2013 | Bogovich | G06Q 40/08 340/995.28 |
| 2004/0102898 | A1 | 5/2004 | Yokota et al. | |
| 2011/0043377 | A1* | 2/2011 | McGrath | G08G 1/096775 340/905 |
| 2012/0136567 | A1* | 5/2012 | Wang | G01C 21/3461 701/414 |
| 2012/0179363 | A1 | 7/2012 | Pierfelice | |
| 2014/0005923 | A1* | 1/2014 | Bank | G01C 21/3658 701/424 |
| 2014/0074402 | A1* | 3/2014 | Hassib | G01C 21/3461 701/533 |

* cited by examiner

*Primary Examiner* — Hussein A. Elchanti
(74) *Attorney, Agent, or Firm* — Jennifer Stec; Brooks Kushman P.C.

(57) ABSTRACT

A system includes a processor configured to gather historical risk-affecting data with respect to a current road. The processor is also configured to gather current risk-affecting data with respect to the current road. Further, the processor is configured to generate a baseline risk index for the road based on the historical data. The processor is additionally configured to modify the baseline risk index based on the current data and provide a risk index value for the current road based on the modified baseline risk index

14 Claims, 6 Drawing Sheets

METHOD AND APPARATUS FOR ROAD RISK INDICES GENERATION

TECHNICAL FIELD

The illustrative embodiments generally relate to a method and apparatus for road risk indices generation.

BACKGROUND

Certain roads and intersections have a higher incident of accidents than other roads and intersections, in any given area. This may be due to higher traffic, higher speed, or possible, for example, to a poorly designed road layout. Other than a driver observing accidents frequently occurring at certain locations, however, it can be difficult for a driver to generally discern where accidents frequently occur. This is even more the case when a driver is traveling through a new area, where there has been no chance for that driver to observe any previous accidents.

SUMMARY

In a first illustrative embodiment a system includes a processor configured to gather historical risk-affecting data with respect to a current road. The processor is also configured to gather current risk-affecting data with respect to the current road. Further, the processor is configured to generate a baseline risk index for the road based on the historical data. The processor is additionally configured to modify the baseline risk index based on the current data and provide a risk index value for the current road based on the modified baseline risk index.

In a second illustrative embodiment, a computer-implemented method includes gathering historical risk-affecting data with respect to a current road. The method also includes gathering current risk-affecting data with respect to the current road. The method further includes generating a baseline risk index for the road based on the historical data. Also, the method includes modifying the baseline risk index based on the current data and providing a risk index value for the current road based on the modified baseline risk index.

In a third illustrative embodiment, a non-transitory machine-readable storage medium stores instructions that, when executed, cause a processor to perform a method including gathering historical risk-affecting data with respect to a current road. The method also includes gathering current risk-affecting data with respect to the current road. The method further includes generating a baseline risk index for the road based on the historical data. Also, the method includes modifying the baseline risk index based on the current data and providing a risk index value for the current road based on the modified baseline risk index.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
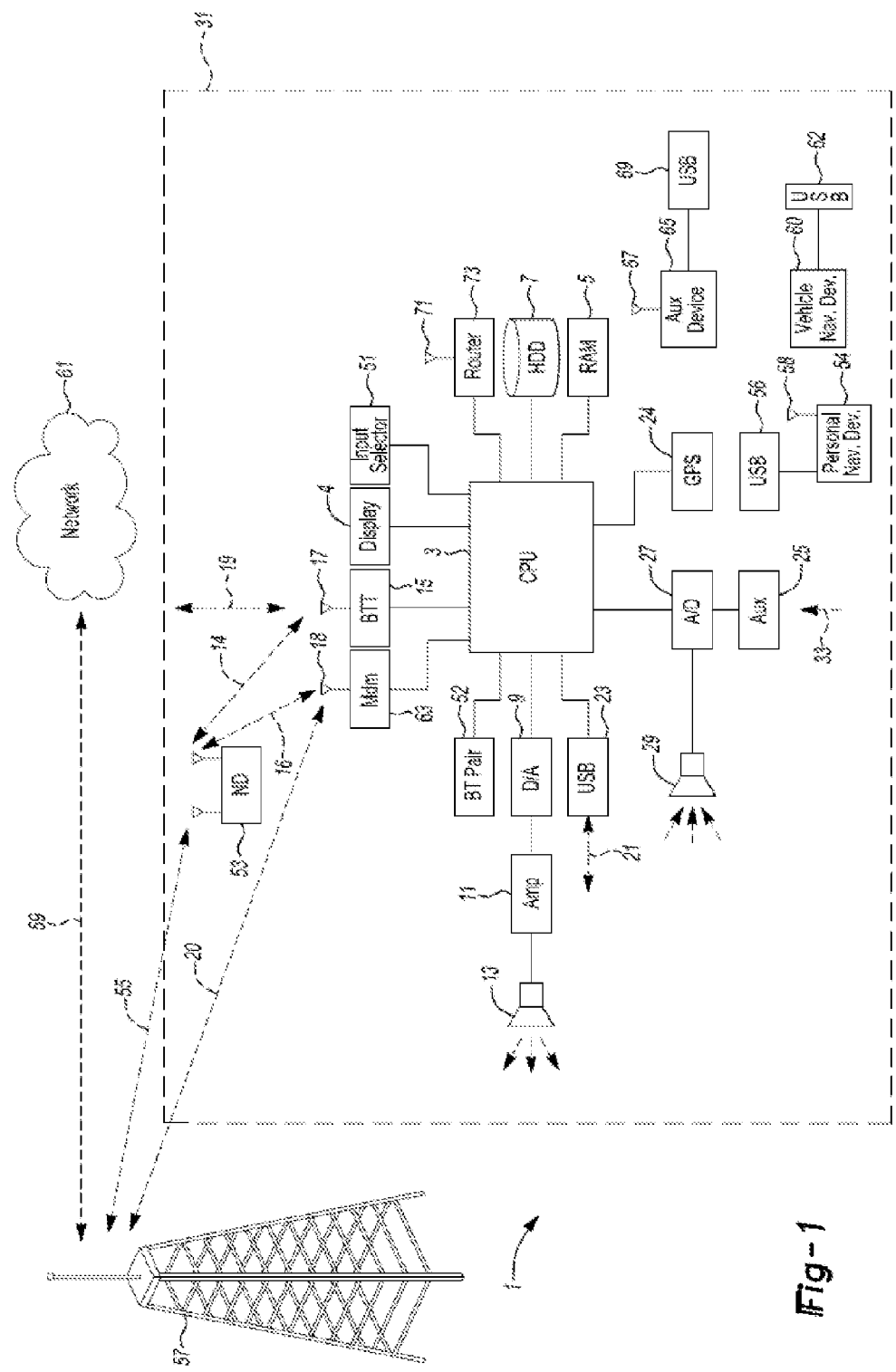
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Figure 2:
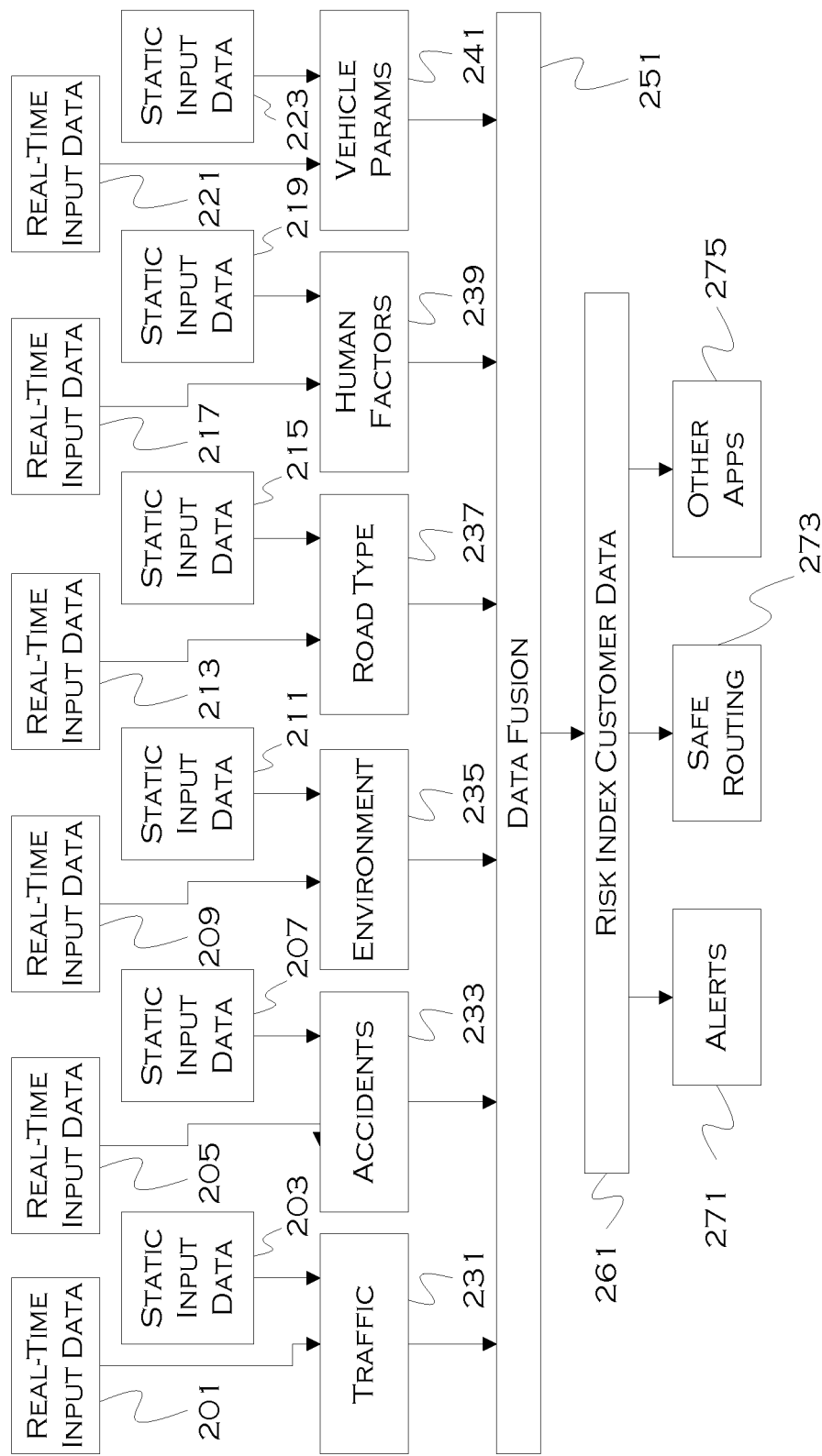
FIG. 2 shows an illustrative example of road risk index inputs.

FIG. 2 shows an illustrative example of road risk index inputs. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative embodiments, crowdsourced data is used to generate risk indices for various roads in a given area. By utilizing data from a variety of sources, and based on a variety of factors, roads in an area can be analyzed in a relatively comprehensive and swift fashion. Also, since correlations may be drawn between the various factors and the degree of accidents, assumptions can be made for both known and unknown roads. For example, if accidents on roads with 55 mph speed limits are observed with 0.05% frequency in rainfall of over 0.5 inches per hour, then if a driver is in new territory in a storm, the degree of accidents on 55 mph roads can be "guessed." This is a very simplistic example, but it shows how gathered data can be used to make assumptions about roads for which no previous data has been gathered.

Using the known data about roads and projected risk for unknown roads, routes can be developed that reduce the risk of accident, at least based on frequency of accidents for the roads. While a certain route with lower risk indices for roads may take longer, it might be a generally "safer" route and thus would be desirable for any number of safety-related reasons.

In the illustrative example of a system shown in FIG. 2, a variety of exemplary factors are shown. Of course, these are not the only factors that could be considered, any suitable factors that aid in the evaluation of accident likelihood may also be utilized.

In this example, each of the factors has real time data and static data input thereto. Examples will be given with respect to each factor, but these are for illustrative purposes only, and are not intended to limit the inputs or data. For example, with respect to traffic 231, real time data 201 can include, but is not limited to, an average speed of traffic, vehicle density and vehicle types, if known. Static data may be limited for certain categories, such as traffic, where the category is essentially dynamic, but certain static data can be used if appropriate. For example, historical traffic data can be used for evaluating likely risk at certain times of day on upcoming sections of route that may still be a distance away.

Other inputs to the data fusion algorithm 251 can include accident data 233. This can include real-time accident data 205, such as, but not limited to, severity and type of current accidents. Static data 207 to the accident inputs can include, for example, a mean/median severity of accidents, types of common accidents on the road, and a history of accidents (per day, per week, per month, time of occurrence, etc).

Environment 235 on roads can also play a role in determining the risk on the route. Environment can be useful in predicting accident likelihood and also in comparing new and unknown roads to previously observed roads. Real time environmental data 209 can include, for example, without limitation, current visibility, weather/surface conditions, construction/hazard data, wind speed and temperatures. Static input data 211 can include, for example, data relating to accident occurrence at different times of days, and historical data correlating accidents to particular environmental conditions.

Road type data 237 can also be input as a factor in evaluating road risk. This data is commonly static 215 and can include, but is not limited to, current surface roughness/potholes, road curve/radius, intersections (existence of, frequency, stop signs/lights/yields), road slopes, road surface types, road types (highway, city street, etc.), number of lanes, speed limits. Dynamic data 213 can also be used as an input, although it is infrequent that road data will be in dynamic flux.

Human factors 239 can also play a role in the determination. If data is known about a driver (through, for example, vehicle data reported by the vehicle), this can be useful. This data could be dynamic 217 or static 219. Data types can include, for example, speeding habits (current or historic), age of driver, driving experience, impairments, distraction, etc. Much of the data in this category can be both current and historic data, depending on what data is available, and is useful in determining a driver's own human effect on riskiness of driving.

Another exemplary parameter, and the last of the examples, although other inputs are certainly also available, includes vehicle parameters 241. Real time data 221 (if available) can include, for example, without limitation, current vehicle brake conditions, tire pressures, on-board diagnostic warnings, the type of vehicle, etc. Static data 223, can include, for example, speed limits, directional traffic flows.

With respect to all of these factors, certain dynamic data may also be available as static historical data. Similarly, static historical data can be available as dynamic data when available from reporting vehicle systems, if appropriate.

The data fusion 251 portion of the system represent the algorithm(s) used to determine risk indices for various roads. This can be generated on a regular basis at regular intervals, or can be generated in an on-demand manner, depending on the architecture and capabilities of the data provision system(s). The output of this process is risk index customer data 261, which can be provided to various vehicles to display/utilize risk data for roads along a current or alternative routes.

This data can be used, for example, without limitation, in generating risk alerts 271 (e.g., a certain road's riskiness rises above a threshold, or perhaps outside the range of a common norm), safe routing (e.g., find roads along a route having only N risk or lower), and by any other suitable application designed to utilize this data 275.

By recording and analyzing current data (reported by vehicles in transit, for example) and historical data, risk patterns can be observed for commonly traveled roads across an entire road network. Observed correlations can also be used to predict the riskiness of less commonly traveled roads, for which there may be less actual data available, so that risk can be approximated even in unfamiliar or uncommon territory. Accordingly, drivers can proceed with some confidence that they have selected roads presenting only a selected likely degree of accident risk.

Figure 3:
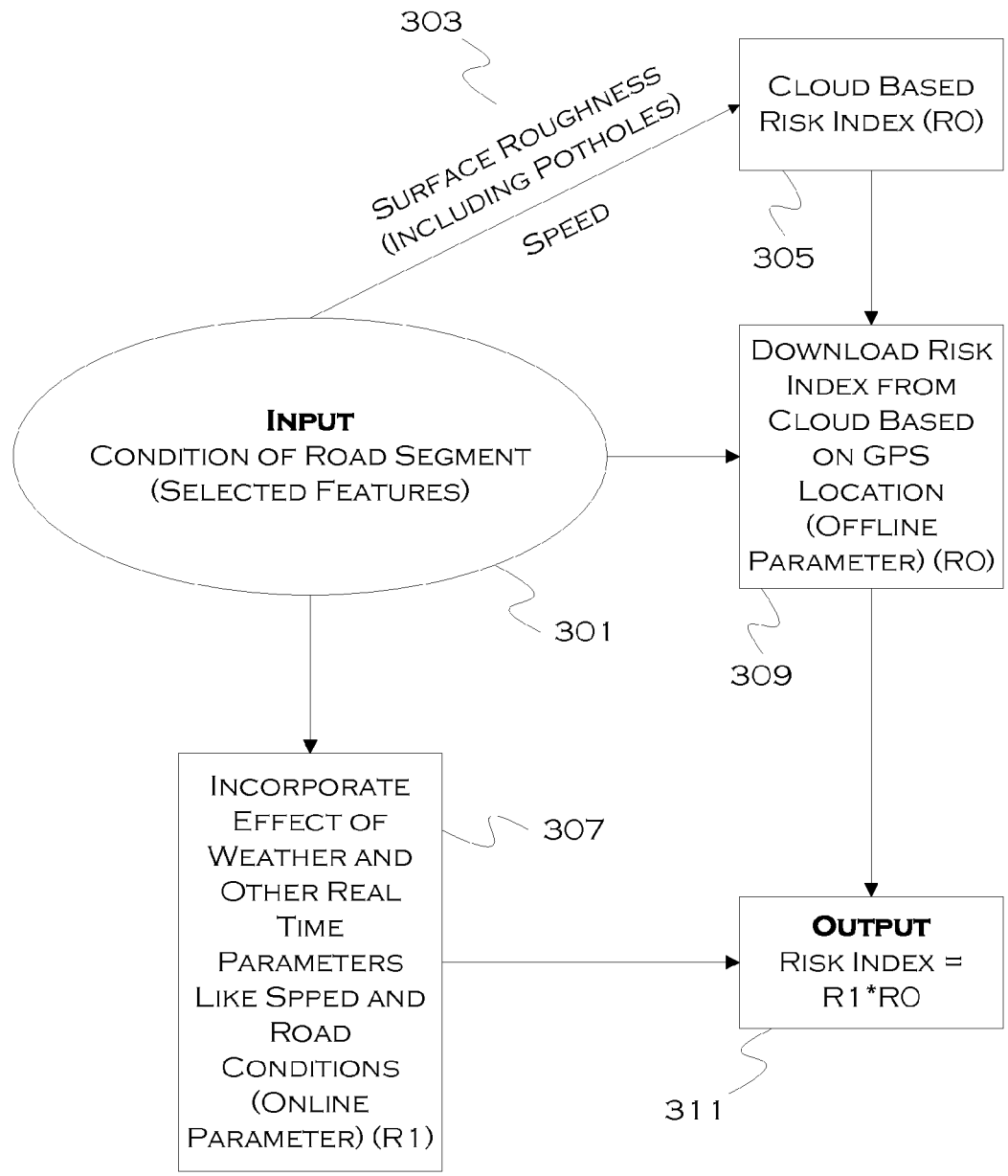
FIG. 3 shows an illustrative example of a road risk generation process.

FIG. 3 shows an illustrative example of a road risk generation process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The rough approximation of a process in FIG. 3 shows some potential inputs 301 into a risk evaluation system. Inputs relating to features of a road 303 can be fed into a cloud algorithm 305 to generate a base risk index for the road (e.g., the static index based on known, fixed conditions). This index can be downloaded based on the GPS location of a vehicle or a GPS point along a route 309.

Also to be considered are dynamic variables that represent current dynamic conditions 307. The effect that these parameters have on risk calculation can be refined over time, as more data is gathered and more correlation can be made between certain conditions and the result of driving in those conditions. This dynamic factor can be combined with the fixed risk value 311 to produce an overall risk index value for a given road or location.

Figure 4:
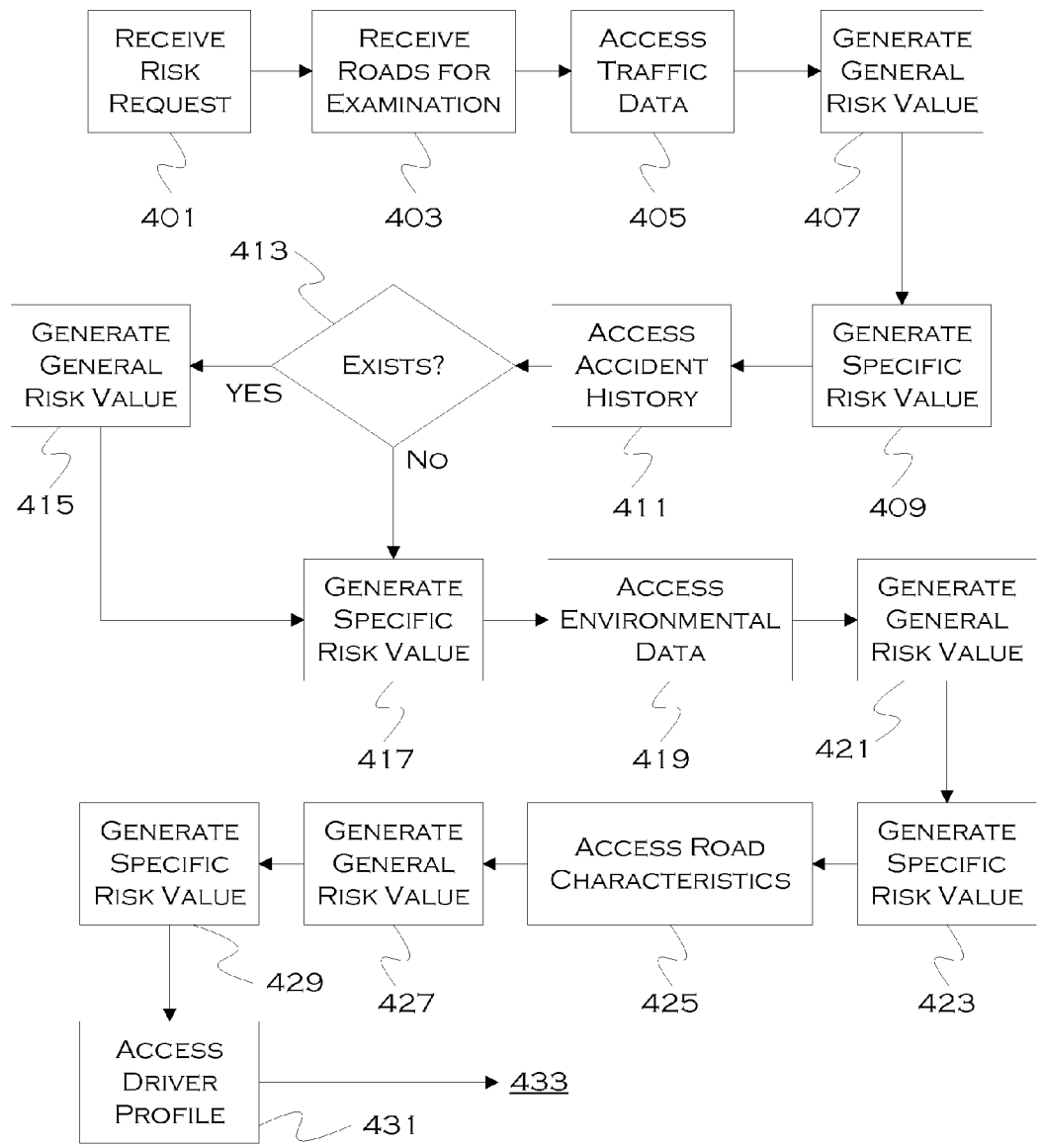
FIG. 4 shows an illustrative process for road risk generation.
Figure 4:
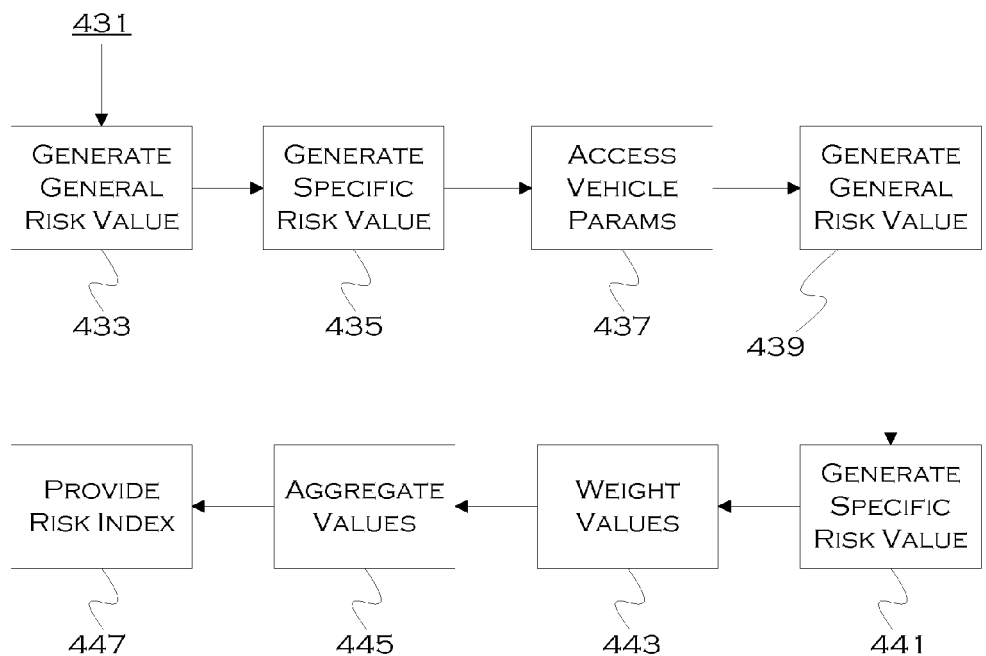

FIG. 4 shows an illustrative process for road risk generation. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a navigation computing system will generate routes including one or more roads for examination. If the driver desires to factor road riskiness in as a factor, for each road or portion of road, a call can be made to a risk analysis process to determine a risk index for the road or road portion. In this example, the process is launched with an incoming request for risk analysis 401. In conjunction with the request, one or more roads, for which risk analysis is desired, are also received 403.

For each factor associated with the road, in this example, dynamic and historical data is considered to generate an overall risk value. In some cases, as shown in FIG. 3, historical data will already be factored into a base risk value for the road, and will not need to be evaluated on the fly.

First, in this example, traffic-related data 405 is gathered. This can include, but is not limited to, average speeds of traffic, vehicle densities, vehicle types, etc. Historic traffic data can be used to generate a base-line traffic risk value for the road 407 (which could, if desired, be incorporated into an overall baseline value, as can each historic base-line generated in this example). Current traffic data can be used to generate a current specific risk value based on actual conditions at the time of the request 409. Both types of information are useful, especially if the road or road segment is not immediately upcoming, because the usefulness of the "current" value will tend to decay with time.

Also gathered, in this example, is accident history for the road 411. As with each of the examples, but shown with respect to only a few, this data can be ignored if the historical data does not exist 413. If there is historical data (severity of accidents, types of accidents, etc.), again, a baseline risk value for the road in general based on accident history may be generated 415. Further, if there are any current accidents, a specific risk value 417 may be generated based on current accidents.

Environmental data can also be utilized 419. While historical data may not be as useful in this category, it can be used to generate an environmental baseline 421 for the road based on commonly occurring environmental conditions (bad lighting, time of day, etc.). Current data can also be used to generate current environmental specific risk effects 423. As with any factor, weightings can always be applied to the values to offset the relative usefulness (based on, for example, observed correlations) of any of the utilized data. So, for example, current environmental data may be given 10× the weight of historical data if it is determined that current environmental data has much more realistic impact on current risk than historical data. On the other hand, in rapidly changing environments, historical data may be weighted higher, to factor in the likelihood that conditions may change by the time the road is actually reached by the driver.

Also considered in this example is road characteristic data 425. This is an example of a case where historical data (e.g., the makeup of the road) is probably more likely to play a factor than current road data, since the road is unlikely to be undergoing significant changes on an ongoing basis. On the other hand, for dirt roads, for example, current road makeup (muddy, wet, etc.) may actually play as much of a factor as historical data. A general risk value for the road 427 and a specific, current risk value 429 for the road can be generated and utilized as appropriate.

A driver profile is also accessed, in this example 431. This profile stores data about the driving behaviors (observed and present) of a vehicle driver, as well as any useful demographic information about the driver than can be used to evaluate risk. The driver data (age, experience, impairments, distractedness, tendency to speed or brake suddenly, etc.) can be used to generate both a general risk profile for the driver 433 and a specific risk profile 435 based on current conditions (such as, for example, distraction, speeding, etc).

Finally, in this example, data about a vehicle is gathered 437. This data relates to a specific vehicle, in this example, namely, the vehicle requesting the riskiness data. This data can include historic observed behavior under certain conditions for the vehicle, and can also include current vehicle state values (low tire pressure, worn brakes, low fuel, etc.). This data, as with the other data, can be used to generate a standard risk profile for the vehicle historically 439, as well as a current risk value for the vehicle based on current vehicle data 441.

In this example, the various generated risk values can then be weighted 443 appropriately, based on each values observed effect on overall risk. With time, this weighting can be made more precise, and may vary from road to road, vehicle to vehicle and driver to driver. As data is gathered and the impact of conditions on a certain driver or vehicle is known, weightings can be shifted to more accurately represent risk to that driver. Also, weightings may be shifted based on the effect that the static or dynamic values generally have based on a certain category.

Once the values have been weighted, if weighting is desired, the process can aggregate the values for each road or road portion 445 and provide an output, back to the requesting entity (typically a vehicle) of risk indexes for each identified road or road portion 447. This data can then be used in an appropriate manner by the requesting entity.

Figure 5:
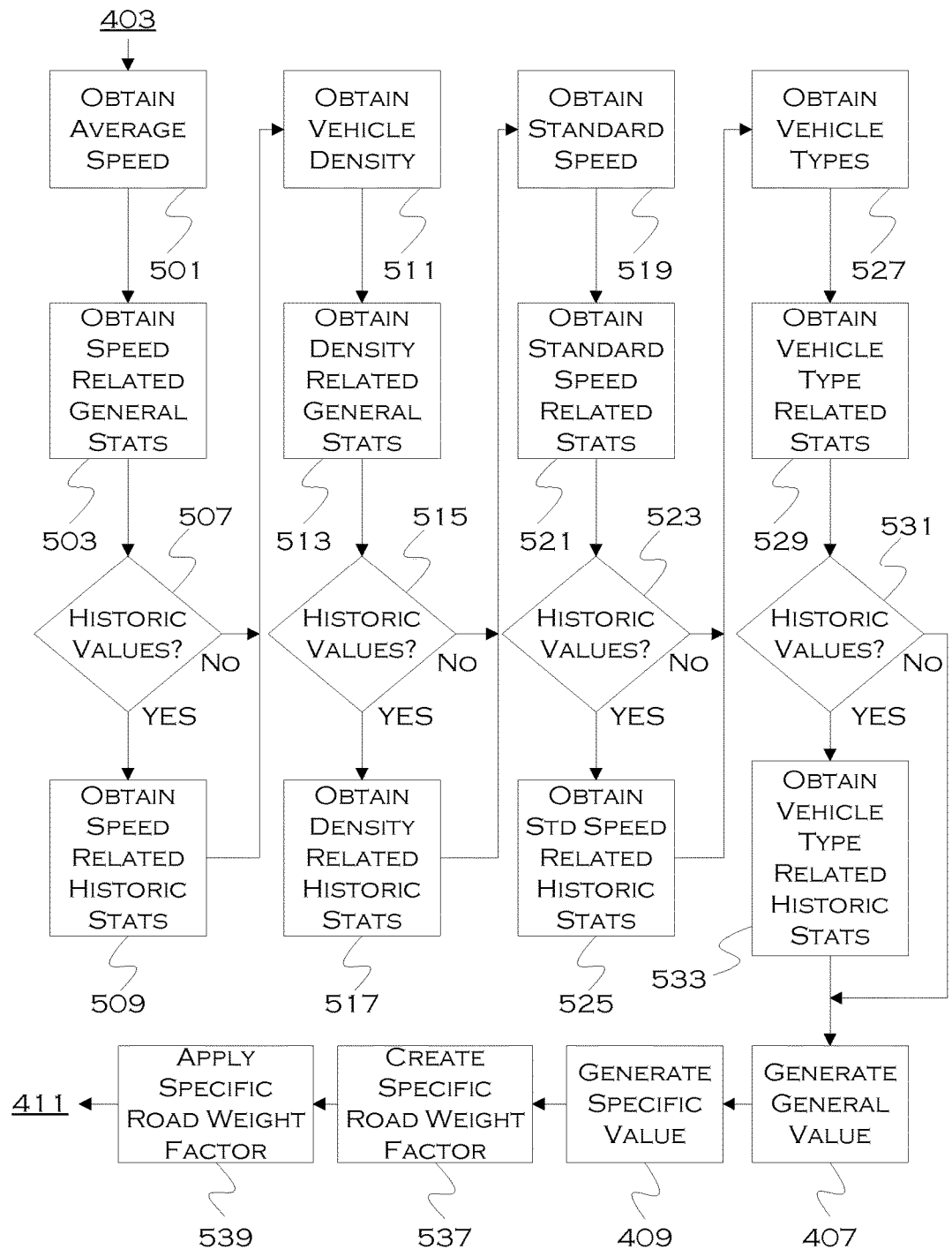
FIG. 5 shows an illustrative process for risk value determination.

FIG. 5 shows an illustrative process for risk value determination. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative example shown in FIG. 5, gathering of traffic-related data is shown in greater detail, as a representative example of how data can be gathered and utilized. A similar process (with the appropriate data types) can be used for each factor in the risk generation input.

For example, in this illustrative process, current vehicle average speed is obtained 501. As with all considered factors, vehicle speed will have some (assigned or determined) affect on overall riskiness of a road. One common way to determine how speed will affect risk can be to observe general statistics on speed vs. risk 503. This is representative of how speed changes risk on all roads, or all roads in an area, for example.

If the requested road has historic available data 507, then the historic data may be considered to determine how speed changes risk on the specific road 509. For example, increasing speed by 5 m.p.h. may change risk by 5 (on an arbitrary scale). But, on a very curvy road, increasing speed by 5 m.p.h. may be observed to, on that specific road, increase risk by a factor of 20. Accordingly, if available, both the specific and general effect of speed on risk will be considered.

Similarly, vehicle density 511 for the route will be obtained. Once again, a general effect of density may be observed 513 and, for a given road, if available 515, a historic effect of density on risk 517 may be observed. With respect to each factor, to the extent that specific data for a road will provide different observed risk effects than will general data, both types of data may be considered.

Also considered in this example are speed limits 519 and vehicle types 527 (e.g., is the traffic comprised of commuter, commercial, etc.). For both factors, general relationships of the factor to risk can be considered 521, 529. Also, if available 523, 531, historic, observed effects of the factors for a given road 525, 533 can be considered.

In this example, based on the gathered data, a general baseline effect of "traffic" on the road historically can be generated (by, for example, aggregating/evaluating the individual factors). Also, a specific effect of the current traffic conditions can be determined. Further, another type of weighting can be applied. If sufficient historical data exists for a given factor, such that a specific effect of that factor on that road is meaningfully different from the general effects of that factor on a generic road having similar characteristics, weighting may be shifted more heavily to the known specific effects. This is different from the weighting applied to each factor's impact on a given driver, but can be used to further tailor the results.

For example purposes only, a scenario will be described using some of the above illustrative concepts to show how each factor can be tailor considered for both a road and a driver. Using inputs of environment, traffic and vehicle, and "sub-factors" of environment:weather, environment:time-of-day, traffic:speed, traffic:density, vehicle:brake-condition, and vehicle:tire-pressure, and a risk scale of 1-100, an example risk calculation will be shown.

For a given road, the current traffic and environmental data is gathered, including at least the sub-factors for the categories. Example values of environment:weather=light rain, environement:time-of-day=6 p.m., traffic:speed=45 m.p.h, traffic density=light are gathered. The vehicle also reports that vehicle:brake-condition=worn, and vehicle:tire-pressure=35 psi.

For each input, the general effect and specific effect (if available) of the input for the given road is determine if appropriate. So, for light rain, it is observed that generally light rain increases risk by a factor of 3, but for seven hundred data points (in this example, a meaningful number) light rain increases risk by a factor of 4. Since the data is meaningful for the specific road, a weighting of 0.9 will be assigned to the specific factor and 0.1 will be assigned to the generic factor. Thus, an overall risk effect of weather=light rain is 3.6. Since weather is a "current" value, this is a dynamic/specific risk factor affected by current conditions.

Time-of-day=6 p.m. may be observed to correlate to dusk, at the current time of year. Assume that there are only fifteen data points for driving at dusk on the given road (a fairly meaningless number), but that there is ample general data. Generally, it may be observed that driving at dusk increases risk by a factor of 2, and there is not enough specific data available, so full weight is given to the specific factor. Once again, this is a dynamic/specific factor affected by current conditions. In this example, there are no baseline values for environment, because only current environmental conditions were considered. Thus, risk for time-of-day in this example is 2.

Also, in this example, traffic:speed=45 m.p.h. may be observed to correlate to a general risk factor of 1. With respect to this road, however, traffic:speed may be observed, over five hundred data points (which will be considered meaningful, for purposes of this example only), to correlate to a risk factor of 2. Because there were slightly fewer data points than with the light rain data, in this example a weight of 0.8 will be assigned to the historical road-specific effect and 0.2 will be assigned to the general effect to generate a speed risk index value of 1.8. The weighting can help account for the fact that even though local data exists, it is not guaranteed, and if there are fifty thousand general data points and five hundred local data points, some weight may be given to the overall observed effect of a given sub-factor.

Traffic density=light may be given a risk factor of 0, and with fifty local data points, may have a local risk factor of 0.5. Although fifty data points is fairly meaningless, in this example, some small weight (0.05) may be given to represent at least some consideration for changes based on locally observed historical data. Thus, the overall risk value for traffic density=0.025.

Both the traffic and weather data represented current conditions, and thus had no effect on a baseline value for a road, which may more likely be derived from static values like road surface. Although baselines could be derived for the factors (environment and traffic) disclosed in this example, none is derived for this illustration.

On the other hand, the brake condition of the vehicle (worn) and the tire pressure (35 psi) are fairly fixed values and can provide a baseline value for the vehicle. Again, if general and historic data for these values is available, the risk effect of brakes=worn might be generally 4 and specifically 3, while the effect of tire pressure=35 psi (recommended for this vehicle) might be 0. If there is enough data to justify a 0.9 weight to the specific vehicle data, then the baseline risk rating of the vehicle is 3.1 (4*0.1+3*0.9+0).

Now the baseline and specific values can be weighted based on observed effect these values have on the specific driver. If very little data is available, then each may be given the same weighting. Here, the weight will be separate for the baseline and specific factors (so 0.5, 0.5, 1). Thus, the final calculation in this example, is (0.5(3.6+2)+0.5(1.8+0.025)) *1(3.1). In this example, and only for illustrative purposes, the equation for risk is the sum of the weighted specific factors (which is the sum of the weighted sub-factors for each factor) times the sum of the weighted baselines (which is the sum of the weighted sub-factors for each baseline factor). So overall risk for the given road would be ~11.8.

On the other hand, it may have been observed over time that this particular driver is little affected by traffic, but is much more affected by weather conditions. Accordingly, weight of 0.2 may be given to traffic, and 0.8 may be given to environment. In such an example, the overall risk factor for this road for this driver would be ~15.

In yet another example, the weighting may be used to amplify or diminish the effects of factors based on observed driving behavior, as opposed to balancing the effects of factors as shown above. In this case, for example, weights of 1 would be assigned to each factor if little or no data was known, and in the second case, perhaps weights of 1.2 would be assigned to weather, and 0.5 would be assigned to traffic. This would again cause weather to weigh more heavily in the overall index value.

Whatever schema is used and whatever factors are gathered, this example was provided solely for illustrative purposes, and does not limit the scope of the invention in any manner. Any suitable risk-affecting factors may be used, and weighting can be applied or not applied as is appropriate. Further, any suitable formula that generates risk index values for roads based on the input factors may also be used. The illustrative embodiments merely showed examples of how risk data could be gathered and used to change routing and driving decisions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
gather historical accident-risk-affecting data and current accident-risk-affecting conditions with respect to a current road;
weight an effect that the conditions have on a known driver, based on a driver profile storing observed effects on driving behavior under similar conditions;
generate a risk value, representing an accident likelihood, for the driver, based on the historical data and the weighted effect; and
present the risk value to the driver.

2. The system of claim 1, wherein the historical accident-risk-affecting data includes road data.

3. The system of claim 1, wherein the current accident-risk-affecting conditions includes current road conditions.

4. The system of claim 1, wherein the historical accident-risk-affecting data includes traffic data.

5. The system of claim 1, wherein the current accident-risk-affecting conditions includes current traffic conditions.

6. The system of claim 1, wherein the historical accident-risk-affecting data includes environmental data.

7. The system of claim 1, wherein the current accident-risk-affecting conditions includes current environmental conditions.

8. The system of claim 1, wherein the current accident-risk-affecting conditions includes a current vehicle operator state.

9. The system of claim 1, wherein the historical accident-risk-affecting data includes vehicle system state data.

10. The system of claim 1, wherein the current accident-risk-affecting conditions includes current vehicle system conditions.

11. The system of claim 1, wherein the processor is further configured to generate the risk value based on observed effects of the historical risk-affecting data with respect to the current road.

12. The system of claim 1, wherein the processor is further configured to generate the risk value based on observed effects of the historical risk-affecting data with respect to roads having similar characteristics to the current road.

13. A computer-implemented method comprising:
gathering historical accident-risk-affecting data and current accident-risk-affecting conditions with respect to a current road;
weighting an effect that the conditions have on a known driver, based on a driver profile storing observed effects on driving behavior under similar conditions;
generating a risk value, representing an accident likelihood, for the driver, based on the historical data and the weighted effect; and
presenting the risk value to the driver.

14. A non-transitory machine-readable storage medium, storing instructions that, when executed, cause a processor to perform a method comprising:
gathering historical accident-risk-affecting data and current accident-risk-affecting conditions with respect to a current road;
weighting an effect that the conditions have on a known driver, based on a driver profile storing observed effects on driving behavior under similar conditions;
generating a risk value, representing an accident likelihood, for the driver, based on the historical data and the weighted effect; and
presenting the risk value to the driver.

* * * * *